United States Patent [19]

Tamaru et al.

[11] Patent Number: 4,733,023
[45] Date of Patent: Mar. 22, 1988

[54] COORDINATE POSITION DIGITIZING SYSTEM FOR DETERMINING POSITION OF A PICK-UP ELEMENT RELATIVE TO A PLATE IN HORIZONTAL AND VERTICAL DIRECTIONS EMPLOYING SEQUENTIAL SWITCHING OF VERTICAL AND HORIZONTAL CONDUCTORS

[75] Inventors: Hideshi Tamaru, Sagamihara; Akio Sakano, Ibaragi; Nobuo Kitamura, Sagamihara; Kimiyoshi Yoshida, Zushi; Kunio Shikakura, Tokyo, all of Japan

[73] Assignee: Sony Corporation, Tokyo, Japan

[21] Appl. No.: 908,959

[22] Filed: Sep. 18, 1986

Related U.S. Application Data

[63] Continuation of Ser. No. 507,092, Jun. 23, 1983, abandoned.

[30] Foreign Application Priority Data

Jul. 10, 1982 [JP] Japan ................................ 57-120441

[51] Int. Cl.⁴ ....................... G08C 21/00; G01B 07/14
[52] U.S. Cl. ..................................... 178/20; 178/18; 324/207; 324/260
[58] Field of Search ............... 324/207, 208, 239, 232; 178/18–20; 33/1 M; 340/706, 709, 365 L

[56] References Cited

U.S. PATENT DOCUMENTS

| | | | |
|---|---|---|---|
| 3,633,180 | 1/1972 | Pabst | 178/19 X |
| 3,668,313 | 6/1972 | Dym | 178/19 |
| 3,975,592 | 8/1976 | Carvey | 178/18 |
| 4,177,354 | 12/1979 | Mathews | 178/18 |
| 4,213,005 | 7/1980 | Cameron | 178/18 |
| 4,214,122 | 7/1980 | Kley | 178/18 |
| 4,334,129 | 6/1982 | Imsand et al. | 178/18 X |
| 4,418,242 | 11/1983 | Kouno | 178/18 X |
| 4,442,317 | 4/1984 | Jandrell | 178/18 |
| 4,471,162 | 9/1984 | Aono et al. | 178/18 X |
| 4,479,032 | 10/1984 | Parnell | 33/1 M X |
| 4,492,819 | 1/1985 | Rodgers et al. | 33/1 M X |
| 4,501,931 | 2/1985 | Ohya et al. | 178/18 |
| 4,507,523 | 3/1985 | Gohra et al. | 178/19 |
| 4,514,688 | 4/1985 | Whetstone | 324/208 |

FOREIGN PATENT DOCUMENTS

| | | | |
|---|---|---|---|
| 2901601 | 7/1980 | Fed. Rep. of Germany | 33/1 M |
| 45823 | 4/1977 | Japan | 178/18 |
| 219931 | 6/1968 | U.S.S.R. | 33/1 M |

*Primary Examiner*—Reinhard J. Eisenzopf
*Assistant Examiner*—Warren S. Edmonds
*Attorney, Agent, or Firm*—Hill, Van Santen, Steadman & Simpson

[57] ABSTRACT

A coordinate position digitizing system comprises a position determining plate having a plurality of first conductors extending in parallel with one another at regularly spaced intervals. A plurality of second conductors also extend in parallel with one another at regularly spaced intervals and across the first conductors. Driving and controlling means are provided in common to the first conductors and the second conductors for selectively energizing in turn one or more of the first conductors and second conductors, for example, by supplying a direct current flowing therethrough. Pick-up means, such as a magnetic flux detecting means, is movably set on the position determining plate for producing a signal in response to field variations on the position determining plate caused by the selective energization of the first conductors and second conductors. Information producing means produces positional data defining a position on the position determining plate to which the pick-up means is brought close, based on the strength of the signal drived from the pick-up means.

10 Claims, 17 Drawing Figures

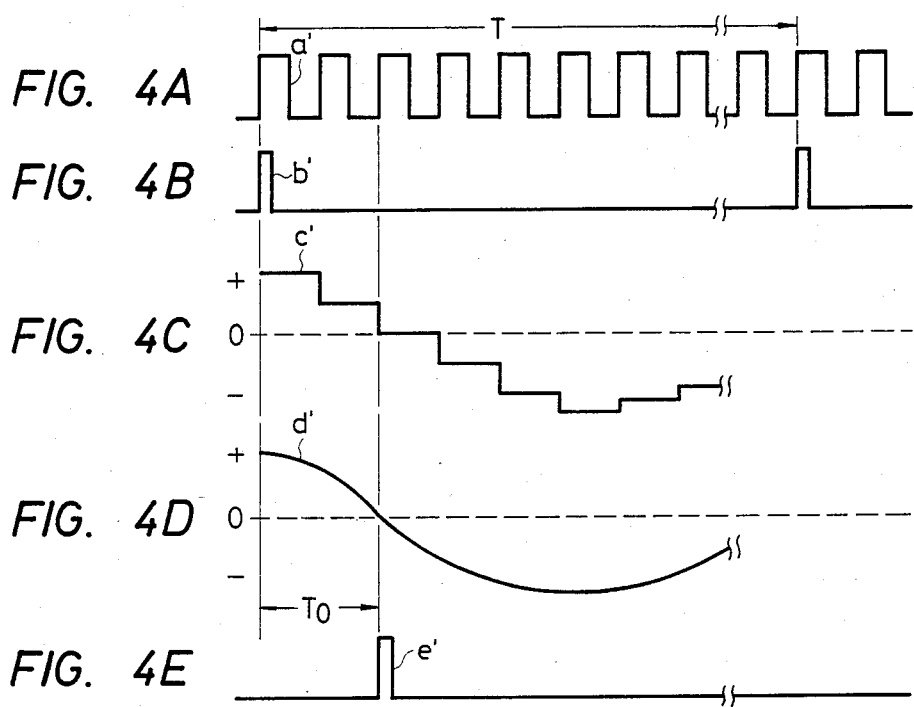
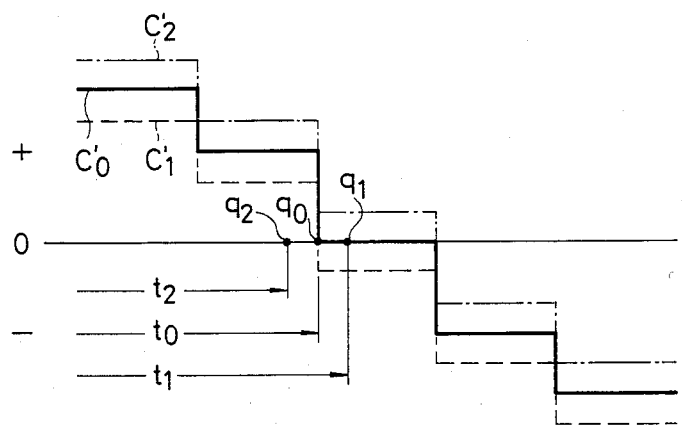

COORDINATE POSITION DIGITIZING SYSTEM FOR DETERMINING POSITION OF A PICK-UP ELEMENT RELATIVE TO A PLATE IN HORIZONTAL AND VERTICAL DIRECTIONS EMPLOYING SEQUENTIAL SWITCHING OF VERTICAL AND HORIZONTAL CONDUCTORS

This is a continuation of application Ser. No. 507,092, filed June 23, 1983 and now abandoned.

BACKGROUND OF THE INVENTION

This invention relates generally to a coordinate position digitizing system using pick-up means, such as a magnetic flux detecting means, which is movably set on a position determining plate to produce a signal indicative of position on the plate. More particularly, it is directed to a system for obtaining positional information defining a position of the pick-up means on a position determining plate on which a plurality of parallel conductors selectively energized are disposed, based on the strength of a signal derived from the pick-up means when the pick-up means is brought close to the plate.

There has been previously proposed a position determining apparatus utilizing magnetic flux changes as shown in FIG. 1. Referring to FIG. 1, a terminal 1 is connected to a power supply (+B) producing a certain DC voltage, while a terminal 2 is grounded. One end of each of a plurality of (five in the example shown) parallel conductors $5_1$–$5_5$ shaped into rectangular form is connected to a common connecting line 4, which is connected to the terminal 1 via a current-limiting resistor 3. The common connecting line 4 and the conductors $5_1$–$5_5$ are disposed on a position determining plate P. The other ends of the conductors $5_1$–$5_5$ are respectively connected to first ends of switches $6_1$–$6_5$ in a switch driving circuit 6, and second ends of the switches $6_1$–$6_5$ are connected together to the terminal 2. The switches $6_1$–$6_5$ in the circuit 6 are actuated in such a manner that only one of them is closed at a time by clock pulses a, as shown in FIG. 2A, which are supplied to the circuit 6 from an oscillator 7, so that a DC voltage obtained across the terminals 1 and 2 is supplied to the rectangular conductors $5_1$–$5_5$ in turn. A frequency divider 8 acts to deliver output pulses, each of which is used as a start pulse b as shown in FIG. 2B, in the ratio of one for every five input clock pulses from the oscillator 7. The output end of the frequency divider 8 is connected to the start terminal 9A of a counter 9, while the output end of the oscillator 7 is connected to a clock input terminal 9B of the counter 9. An amplifier circuit 11A having high input impedance is provided for amplifying a pulse signal which is produced by a pick-up coil 10 when the pick-up coil 10 is brought close to the plate P having the conductors $5_1$–$5_5$, and supplying an output signal c, such as shown in FIG. 2C, to a polarity detecting circuit 11B. The polarity detecting circuit 11B produces an output pulse used as a step pulse d, as shown in FIG. 2D, for every two successive pulses of the same polarity in the output signal c from the amplifier circuit 11A. The output end of the polarity detecting circuit 11B is connected to the stop terminal 9C of the counter 9. The output terminal 9D of the counter 9 is connected to a memory 12 which is supplied with output data obtained from the counter 9 and delivers the data to a signal processing circuit (not shown in the drawing Figs.).

In the operation of the prior art apparatus constructed as described above, it is assumed that the pick-up coil 10 is located at a point x on the plate P, that is, within the loop formed by the conductor $5_3$, and the switches $6_1$–$6_5$ in the switch driving circuit 6 are successively closed corresponding to each of the leading edges of the clock pulses a produced by the oscillator 7. When the switch $6_1$ is closed, the frequency divider 8 supplies the first start pulse b to the start terminal 9A of the counter 9, so that the counter 9 starts operating. Then, the conductors $5_1$–$5_5$ produce a variable magnetic field, and the pick-up coil 10 located at the point x on the plate P detects variations in the magnetic flux of the magnetic field and produces the pulse signal in response to the variations in the magnetic flux. This pulse signal is amplified by the amplifier circuit 11A to produce the output signal c from the latter. When the conductor $5_3$ is supplied with the DC voltage to produce a direct current flowing therethrough, that is, the switch $6_3$ is closed, the output signal c takes particular pulses different in phase from the pulses taken when the switch $6_1$ or $6_2$ is closed. The polarity detecting circuit 11B is operative to discriminate these particular pulses by detecting two successive pulses having the same polarity in the output signal c, and whenever such two successive pulses of the same polarity are detected, the polarity detecting circuit 11B produces the stop pulse d and supplies it to the stop terminal 9C of the counter 9. Thus, the counting operation of the counter 9 is initiated upon the leading edge of each start pulse b and stopped upon the leading edge of each stop pulse d. The result of the counting obtained by the counter 9 during the period from the leading edge of the start pulse b to the leading edge of the stop pulse d is transferred to the memory 12. In this specific example, the counter 9 starts counting at the leading edge of the first one of the clock pulses a and stops counting at the leading edge of the third one of the clock pulses a, and the result of counting during a period of time t equivalent to the duration of two cycles of the clock pulses a is supplied to the memory 12 in the form of data corresponding to the positional information concerning the point x.

When the pick-up coil 10 is moved from the point x to any other point on the plate P, the output signal c appearing at the output end of the amplifier circuit 11A has a waveform which is the same as a waveform obtained by shifting the waveform shown in FIG. 2C to the right or left along the abscissa representing time. This causes the time point at which two successive pulses of the same polarity in the pulse signal c are detected to be also shifted, so that the instant at which the stop pulse d is produced by the polarity detecting circuit 11B is made earlier or later. In this manner, new positional information concerning the position of the pick-up coil 10 on the plate P is obtained.

The aforementioned conventional apparatus determines the position of the plate P where the pick-up coil 10 is brought near based on the strength of the polarity of the pulses in the output signal c appearing at the output end of the amplifier circuit 11A in response to the pulse signal induced in the pick-up coil 10, and therefore the conventional apparatus can simply derive the positional information indicating one of the loops formed by the conductors $5_1$–$5_5$ in which the pick-up coil 10 is located. Accordingly, more specific positional information concerning the position of the pick-up coil 10, that is, positional information representing the detailed position of the pick-up coil 10 within one of the loops, cannot be obtained by the conventional apparatus. The conventional apparatus encounters the disadvantage that the resolution in detecting a position thereby is unsatisfactorily low. Further, in case the pick-up coil 10 is located between two parallel and neighboring conductors through which the DC current flows in apposite directions and which are the portions of two of the conductors $5_1$-$5_5$, there arises a possibility of malfunction. Consequently, the space between such two parallel and neighboring conductors is required to be made as narrow as possible, but this ideal is not attained because of the limitations in manufacturing. This results in that some locations unavoidably remaining at which the position of the pick-up coil 10 is detected in uncertain fashion.

When it is desired to obtain positional information defining the position of the pick-up coil 10 in two different directions, for example, the horizontal and vertical directions, a coordinate position digitizing system comprising the position determining apparatus shown in FIG. 1 and an additional position determining plate P′ accompanied with another switch driving circuit which are similar to the position determining plate P and the switch driving circuit 6 shown in FIG. 1, respectively, is provided. In such a coordinate position digitizing system, two position determining plates P and P′ are so disposed that the conductors on the position determining plate P are perpendicular to the conductors on the position determining plate P′ and made operative alternately in order to produce, for example, horizontal positional information and vertical positional information, respectively.

However, in such a prior art coordinate position digitizing system using two position determining plates on which the conductors are mounted, since two independent switch driving circuit arrangements are provided for supplying the DC current to the conductors on the two position determining plates P and P′ in turn, there is the defect that the configuration of the switch driving circuit arrangements is made very complicated.

SUMMARY OF THE INVENTION

Accordingly, it is an object of the present invention to provide a coordinate position digitizing system using pick-up means movably set on a position determining plate to produce a signal concerning the position thereof on the plate, and which can avoid the above described difficulties encountered with the prior art.

Another object of the present invention is to provide a coordinate position digitizing system using pick-up means set movably on a position determining plate to produce a signal concerning the position thereof on the plate, which is capable of digitizing a position on the plate with improved resolution, and which eliminates the uncertainness in digitizing the position.

A further object of the present invention is to provide a coordinate position digitizing system using pick-up means movably set on a position determining plate to produce a signal concerning the position thereof on the plate, and which can produce positional data defining a position on the plate in two different directions, such as the horizontal and vertical directions, with a simplified driving circuit arrangement for the plate.

A still further object of the present invention is to provide a coordinate position digitizing system using magnetic flux detecting means movably set on a position determining plate having a plurality of conductors to produce a magnetic field thereon, which can produce positional data defining a position on the plate in the horizontal and vertical directions with a simplified driving circuit arrangement for supplying a current to each of the conductors on the plate in turn.

According to an aspect of the present invention, there is provided a coordinate position digitizing system comprising a position determining plate having a plurality of first conductors extending in parallel with one another at regularly spaced intervals, a plurality of second conductors also extend in parallel with one another at regularly spaced and across the first conductors. Driving and controlling means and provided in common to the first conductors and second conductors for energizing selectively in turn one or more of the first conductors and second conductors. Pick-up means are movably set on the position determining plate for producing a signal in response to field variations on the position determining plate caused by the selective energization of the first conductors and second conductors. Information producing means are provided for producing positional data defining a position on the position determining plate to which the pick-up means is brought close based on the strength of the signal derived from the pick-up means. The first conductors and second conductors may be selectively energized by supplying a direct current flowing therethrough and the pick-up means may be formed into a magnetic flux detecting device for detecting variations in the magnetic field across the position determining plate.

The above, and other objects, features and advantages of the present invention will become apparent from the following detailed description thereof taken in conjunction with the accompanying drawings.

BRIEF DESCRIPTION OF THE DRAWINGS

FIGS. 4A, 4B, 4C, 4D, 4E and 5 are waveform diagrams used for explaining the operation of the embodiment of FIG. 3;

DETAILED DESCRIPTION OF THE PREFERRED EMBODIMENTS

Figure 1:
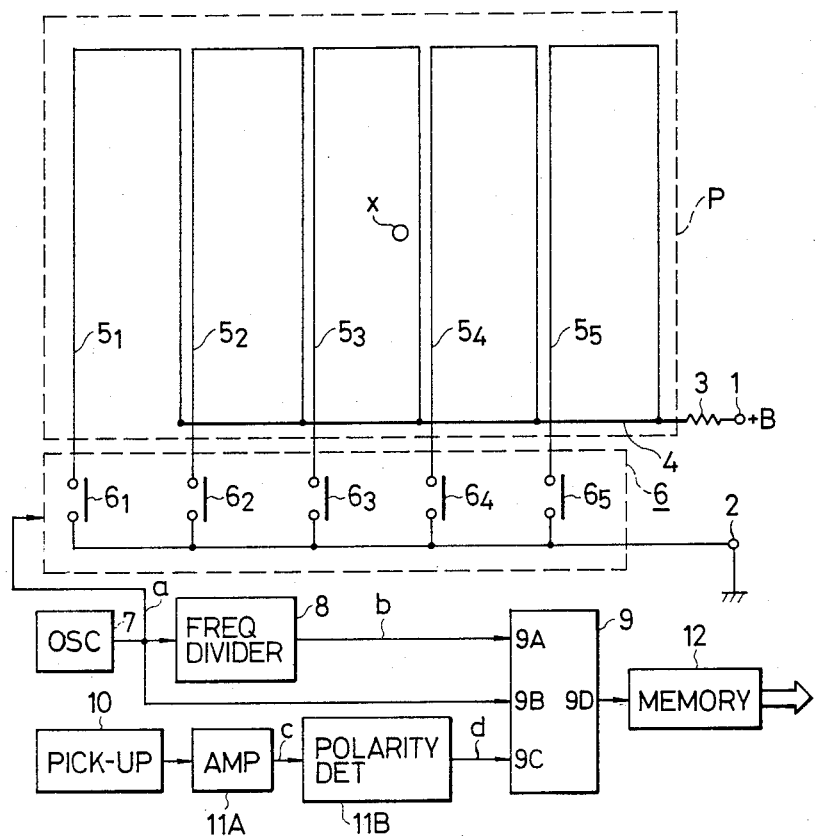
FIG. 1 is a schematic representation of a conventional position determining apparatus.
Figure 2A:
FIGS. 2A, 2B, 2C and 2D are waveform diagrams used for explaining the operation of the apparatus of FIG. 1.
Figure 2B:
Figure 2C:
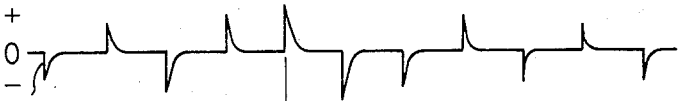
Figure 2D:
Figure 3:
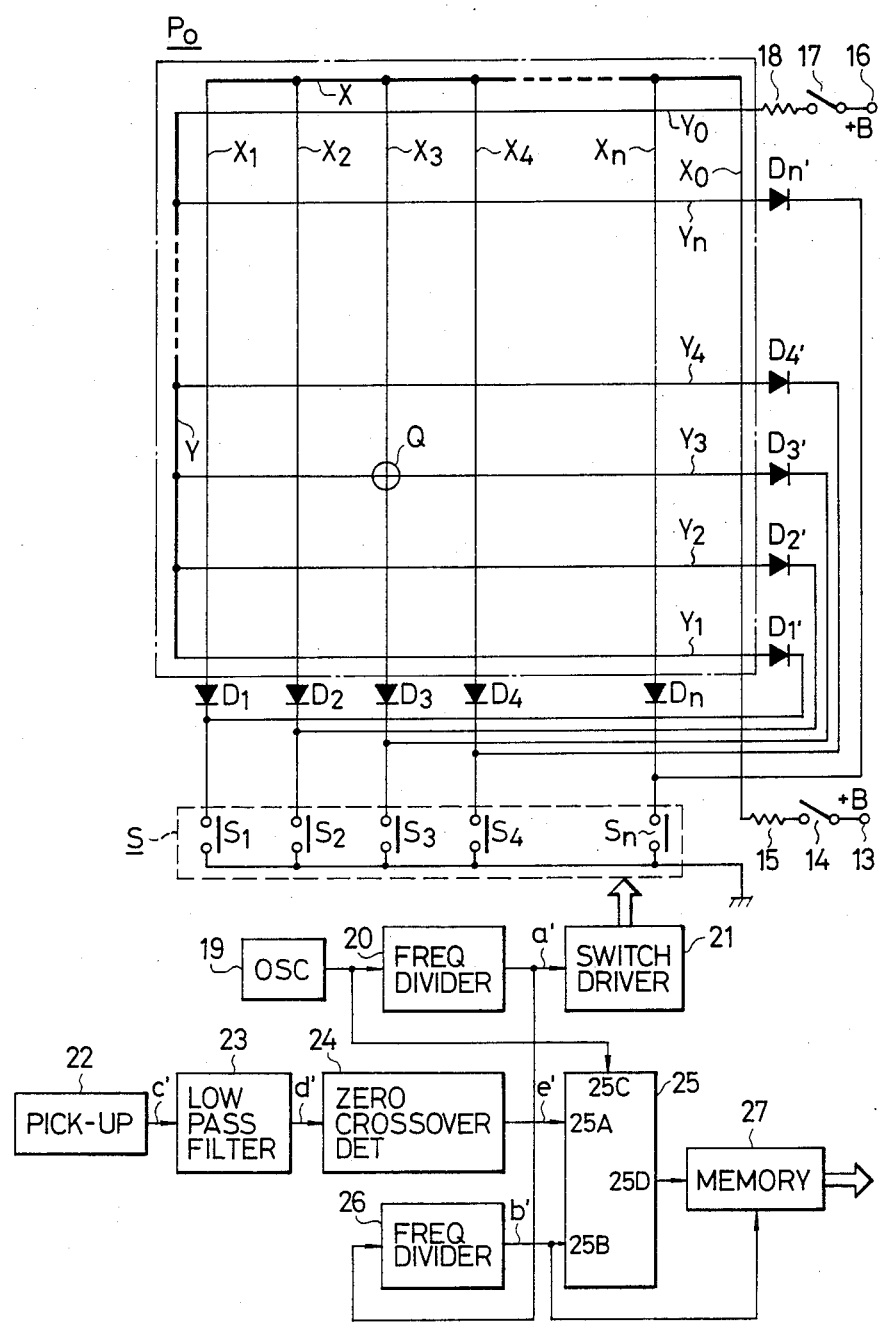
FIG. 3 is a schematic representation of an embodiment of a coordinate position digitizing system according to the present invention.

Referring now to FIG. 3, there is shown the schematic construction of a coordinate position digitizing system embodying the concept of the present invention. In this embodiment, a power supply (+B) producing a certain DC voltage is connected to a terminal 13, which is connected to one end of a baseline $X_0$ through a switch 14 and a current-limiting resistor 15. The other end of the baseline $X_0$ is connected to a common connecting line X, with which one end of each of a plurality of (n) conductors $X_1$-$X_n$ is connected. The conductors $X_1$-$X_n$ are positioned so as to be spaced by a given distance from and parallel with one another. The other ends of the conductors $X_1$-$X_n$ are connected to the anodes of diodes $D_1$-$D_n$, respectively, and the cathodes of the diodes $D_1$-$D_n$ are connected respectively to first ends of switches $S_1$-$S_n$ forming a switch circuit S. The second ends of the switches $S_1$-$S_n$ are connected together and grounded.

The power supply (+B) is also connected to a terminal 16, which is connected to one end of a baseline $Y_0$ through a switch 17 and a current-limiting resistor 18. The other end of the baseline $Y_0$ is connected to another common connecting line Y, to which one end of each of a plurality of (n) conductors $Y_1$-$Y_n$ is connected. The conductors $Y_1$-$Y_n$ is also positioned so as to be spaced by a given distance from and parallel with one another. The other ends of the conductors $Y_1$-$Y_n$ are connected respectively to the anodes of diodes $C_1'$-$D_n'$, the cathodes of which are connected to the junction points of the cathodes of the diodes $D_1$-$D_n$ and the respective first ends of the switches $S_1$-$S_n$.

The conductors $X_1$-$X_n$ and the conductors $Y_1$-$Y_n$ are positioned perpendicular relative to each other, and a position determining plate $P_o$ is formed to have the conductors $X_1$-$X_n$ and $Y_1$-$Y_n$ thereon. The conductors $X_1$-$X_n$ determine a horizontal position and the conductors $Y_1$-$Y_n$ determine a vertical position on the position determining plate $P_o$. The switch 14 is open when the switch 17 is closed and vice versa.

The output end of a reference oscillator 19 is connected to the input end of a frequency divider 20, the output terminal of which is connected to the switch circuit S comprising the aforementioned switches $S_1$-$S_n$ through a switch driver 21. The embodiment further includes a pick-up coil section 22, which acts as magnetic flux detecting means and includes a pick-up coil and an amplifier circuit having a low input impedance for amplifying the output of the pick-up coil. The amplifier circuit may be formed into a grounded-base transistor amplifier, for example. The output end of the pick-up coil section 22 is connected to a low-pass filter 23, the output terminal of which is connected to the input end of a zero-crossover detector 24 for detecting inversions in the polarity of its input signal. The output end of the zero-crossover detector 24 is connected to the stop terminal 25A of a counter 25 which is provided for generating positional data. The output end of the frequency divider 20 is connected to the start terminal 25B of the counter 25 through a frequency divider 26. The counter 25 further has a clock terminal 25C, to which the output end of the reference oscillator 19 is connected, and an output terminal 25D connected to a memory 27. The memory 27 has a control terminal, to which the output end of the frequency divider 26 is connected, and an output terminal connected to a signal processing circuit (not shown in Figs.) for processing data supplied thereto in a predetermined manner.

Now, the operation of the embodiment constructed as mentioned above will be described with reference to the waveform diagrams of FIGS. 4A–4E and 5 hereinafter. When the switch 14 is closed and the switch 17 is opened under the condition in which the terminals 13 and 16 are supplied with the DC voltage from the power supply (+B), that is, when the horizontal position detection is carried out, the frequency of a reference signal generated by the reference oscillator 19 is divided down to a given frequency by the frequency divider 20 and a pulses a' are obtained as shown in FIG. 4A from the frequency divider 20. The pulses a' are modified by the switch driver 21 so as to be suitable for supply to the switch circuit S and for closing the switches $S_1$-$S_n$ therein. In this way, the switches $S_1$-$S_n$ in the switch circuit S are successively actuated so that only one of them is closed at a time. For instance, when the switch $S_1$ is closed, a direct current resulted from the DC voltage supplied to the terminal 13 from the power supply (+B) flows through a rectangular path formed by the terminal 13, switch 14, resistor 15, baseline $X_0$, common connectiong line X, conductor $X_1$, diode $D_1$, switch $S_1$ and ground in this order.

Next, when the switch $S_2$ is closed, a direct current resulting from the DC voltage supplied to the terminal 13 from the power supply (+B) flows through a rectangular path that is similar to but narrower by the space between the conductors $X_1$ and $X_2$ than the above mentioned rectangular path.

Similarly, when the switches $S_3$-$S_n$ are closed in turn, a direct current flows through respective rectangular paths which are made narrower step by step. The diodes $D_1'$-$D_n'$ prevent the direct current from flowing into the conductors $Y_1$-$Y_n$. The pulse a' from the frequency divider 20 is supplied to the frequency divider 26 and divided in frequency to produce pulses b' indicative of a reference time point in the ratio of one for n of the pulses a' (n is the number of the conductors $X_1$-$X_n$), as shown in FIG. 4B. These pulses b' are fed from the frequency divider 26 to the start terminal 25B of the counter 25 to cause the counter 25 to start counting and also to the memory 27 as a transfer commanding signal.

In such a state if the pick-up coil section 22 is brought close to a point Q corresponding to the intersection of the conductors $X_3$ and $Y_3$ on the plate $P_o$, variations in the magnetic field at the point Q on the plate $P_o$ are detected by the pick-up coil section 22 and a signal c' having the level varying stepwise as shown in FIG. 4C is generated at the output end of the pick-up coil section 22 during the period in which the switches $S_1$-$S_n$ of the switch circuit S are actuated successively. The signal c' is fed to the low-pass filter 23 which allows only the low frequency components of the signal c' to pass therethrough and a signal d' having the smooth waveform as shown in FIG. 4D is obtained from the low-pass filter 23. The signal d' is then fed to the zero-crossover detector 24 and the zero-crossover point in the signal d', at which an inversion of the polarity occurs, is detected in the zero-crossover detector 24. This detection produces a pulse e' indicative of a measured time point as shown in FIG. 4E and then the pulse e' is fed to the stop terminal 25A of the counter 25 to cause the counter 25 to stop counting.

Accordingly, the operation of the counter 25 is started by the pulse b' derived from the frequency divider 26 and stopped by the pulse e' derived from the zero-crossover detector 24. The period $T_o$ beginning at the leading edge of the pulse b' acting as a start pulse for the counter 25 and ending at the leading edge of the pulse e' serving as a stop pulse for the counter 25 is measured with the result of the counter 25, and the horizontal position of the point Q on the plate $P_o$ to which the pick-up coil section 22 is located close is determined by the ratio of the period $T_o$ to the time T taken to successively close all the switches $S_1$-$S_n$ in the switch circuit S. Then, the positional data defining the determined horizontal position are obtained from the counter 25 and transferred to the memory 27.

On the other hand, when the switch 14 is closed and the switch 17 is made open, that is, when the vertical position detection is effected, the switches $S_1$-$S_n$ in the switch circuit S are successively closed and a direct current resulted from the DC voltage supplied to the terminal 16 from the power supply (+B) flows through respective rectangular paths which are made narrower step by step in the same manner as aforementioned in connection with the horizontal position detection. Also in this case, the diodes $D_1$-$D_n$ prevent the direct current from flowing into the conductors $X_1$-$X_n$. The energization of the conductors $Y_1$-$Y_n$ produces variations in the magnetic field over the plate $P_o'$ and the variations in the magnetic field are detected at the point Q on the plate $P_o$ by the pick-up coil section 22. Thus, the vertical position of the point Q on the plate $P_o$ to which the pick-up coil section 22 is closely located is determined, and the positional data defining the determined vertical position are obtained from the counter 25 to be transferred to the memory 27, in the same manner as described above in connection with the horizontal position detection.

Then, a situation in which the pick-up coil section 22 is brought close to a point not substitute above any of the conductors $X_1$-$X_n$ on the plate $P_o$ will be described hereinafter by taking the conductor $X_3$ by way of example. First, when the pick-up coil section 22 is located just above the conductor $X_3$, for example, the signal appearing at the output end of the pick-up coil section 22 has a waveform which is symmetrical on the positive and negative sides in the vicinity of the zero level as shown in the form of a signal $c'_0$ indicated by a solid line in FIG. 5. If the pick-up coil section 22 is located between the conductor $X_3$ and the conductor $X_4$ neighboring to the conductor $X_3$ on the right side thereof, a signal $C'_1$ indicated by a broken line in FIG. 5 is obtained from the pick-up coil section 22. The level of the signal $c'_1$ is lower than the corresponding level of the signal $c'_0$. Therefore, a zero-crossover point $q_1$ of a signal which is obtained by filtering out the low frequency components of the signal $c'_1$ having the appearance of a staircase by the low-pass filter 23 is moved to the right from a zero-crossover point $q_0$ obtained in the case of the signal $c'_0$, as shown in FIG. 5.

On the other hand, if the pick-up coil section 22 is located between the conductor $X_3$ and the conductor $X_2$ neighboring to the conductor $X_3$ on the left side thereof, a signal $c'_2$ indicated by a dot-dash line in FIG. 5 is obtained from the pick-up coil section 22. The level of the signal $c'_2$ is higher than the corresponding level of the signal $c'_0$. Accordingly, a zero-crossover point $q_2$ of a signal which is obtained by filtering out the low frequency components of the signal $c'_2$ in the form of a staircase by the low-pass filter 23 is moved to the left from the zero-crossover point $q_0$ obtained in the case of the signal $c'_0$. In each of these cases, the zero-crossover detector 24 produces the pulse $e'$ whenever it detects the zero-crossover point $q_0$, $q_1$ or $q_2$, and therefore the horizontal position of the point on the plate $P_o$ to which a pick-up coil section 22 is brought close is determined in the fine scale smaller than the space between each two neighboring conductors $X_1$-$X_n$ by measuring the period $t_0$, $t_1$ or $t_2$ (FIG. 5) beginning with the initiation of the actuation of the switches $S_1$-$S_n$ in the switch circuit S and ending with the occurrence of the pulse $e'$ from the zero-crossover detector 24.

Further, when the pick-up coil section 22 is brought close to a point not just above any of the conductors $Y_1$-$Y_n$, the vertical position of such a point is detected in the fine scale smaller than the space between each two neighboring conductors $Y_1$-$Y_n$ in the same way as the foregoing case.

Figure 6:
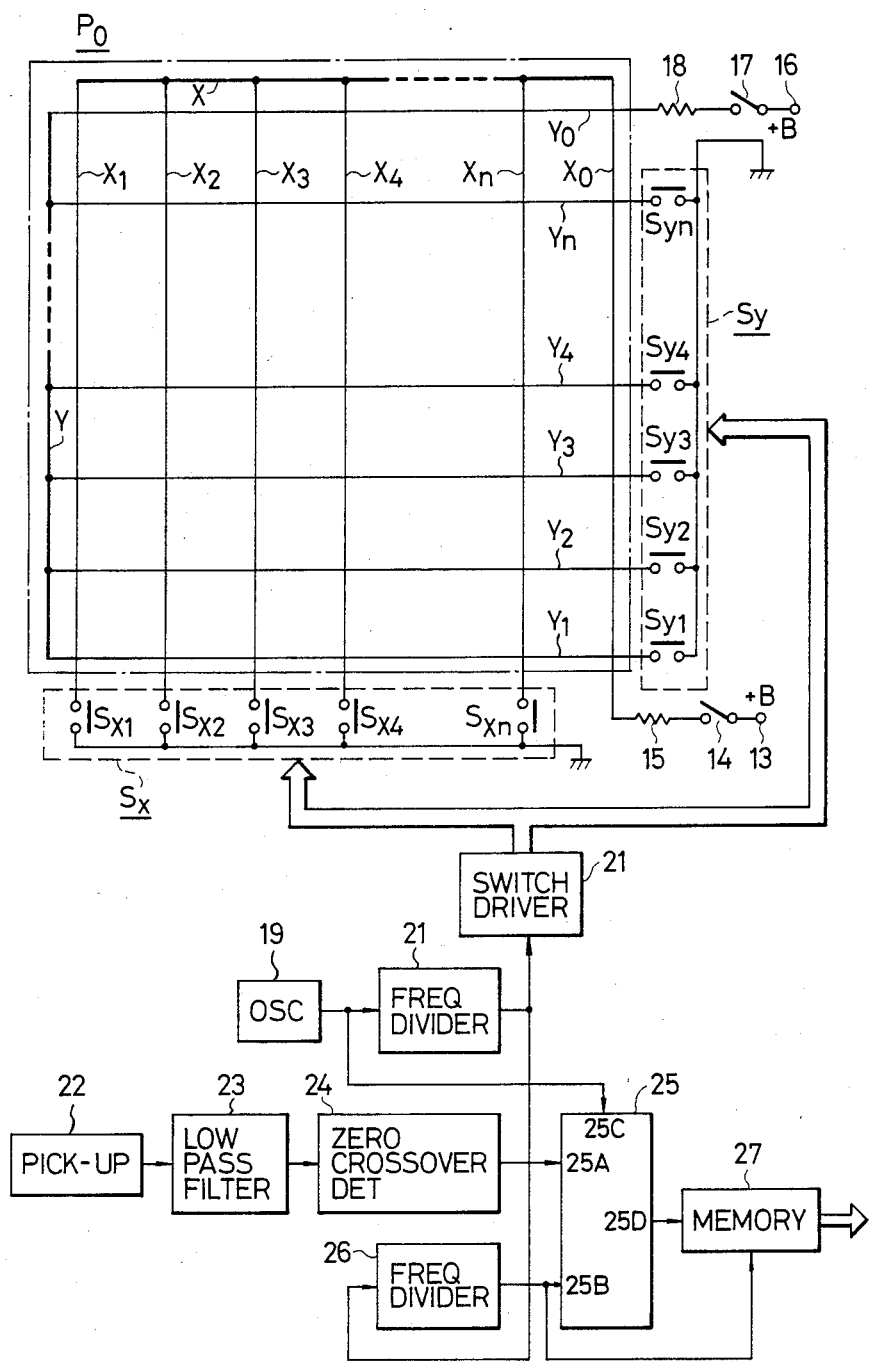
FIG. 6 is a schematic representation of another embodiment of a coordinate position digitizing system according to the present invention.

Referring next to FIG. 6, there is shown another embodiment of the coordinate position digitizing system. In FIG. 6, components and parts corresponding to those of FIG. 3 are marked with the same references and further description thereof will be omitted. The system of FIG. 6 does not have diodes such as the diodes $D_1$-$D_n$ and $D_1'$-$D_n'$ shown in FIG. 3, but includes a switch circuit $S_X$ comprising switches $S_{X1}$-$S_{Xn}$ each having one end connected to conductors $X_1$-$X_n$, respectively, and a switch circuit $S_Y$ comprising switches $S_{Y1}$-$S_{Yn}$ each having one end connected to conductors $Y_1$-$Y_n$. The other ends of the switches $S_{X1}$-$S_{Xn}$ are connected together and grounded and the other ends of the switches $S_{Y1}$-$S_{Y2}$ are also connected and grounded. The output end of the switch driver 21 is connected to both of the control terminals of the switch circuits $S_X$ and $S_Y$.

In the configuration described above, when the horizontal position detection is effected under the condition in which the switch 14 is made open and the switch 17 is closed, the switches $S_{X1}$-$S_{Xn}$ in the switch circuit $S_X$ are successively actuated so that only one is closed at a time by the signal supplied the switch driver 21. Thus, a direct current resulted from the DC voltage supplied to the terminal 13 from the power supply (+B) flows through respective rectangular paths which are formed by the conductors $X_1$-$X_n$, baseline $X_0$ and common connected line X and made narrower step by step. Such energization of the conductors $X_1$-$X_n$ causes variations in the magnetic field over the plate $P_o$, and these variation in the magnetic field are detected by the pick-up coil section 22, so that the horizontal position of the point on the plate $P_o$ to which the pick-up coil section 22 is brought close is determined. Although the switches $S_{Y1}$-$S_{Yn}$ in the switch circuit $S_Y$ are also successively actuated so that only one is closed at a time in the same manner as the switches $S_{X1}$-$S_{Xn}$ in the switch circuit $S_X$, the conductors $Y_1$-$Y_n$ are not energized with a direct current because the switch 17 is open.

On the other hand, when the switch 14 is opened and the switch 17 is closed to effect the vertical position detection, a direct current resulting from the DC voltage supplied to the terminal 16 from the power supply (+B) flows through respective rectangular paths which are formed by the conductors $Y_1$-$Y_n$, baseline $Y_0$ and common connected line Y and made narrower step by step in the same manner as the foregoing case. The energization of the conductors $Y_1$-$Y_n$ carried out in this manner causes variations in the magnetic field over the plate $P_o$, and these variations in the magnetic field are detected by the pick-up coil section 22. As a result of this, the vertical position of the point on the plate $P_o$ to which the pick-up coil section 22 is brought close is detected.

Figure 7:
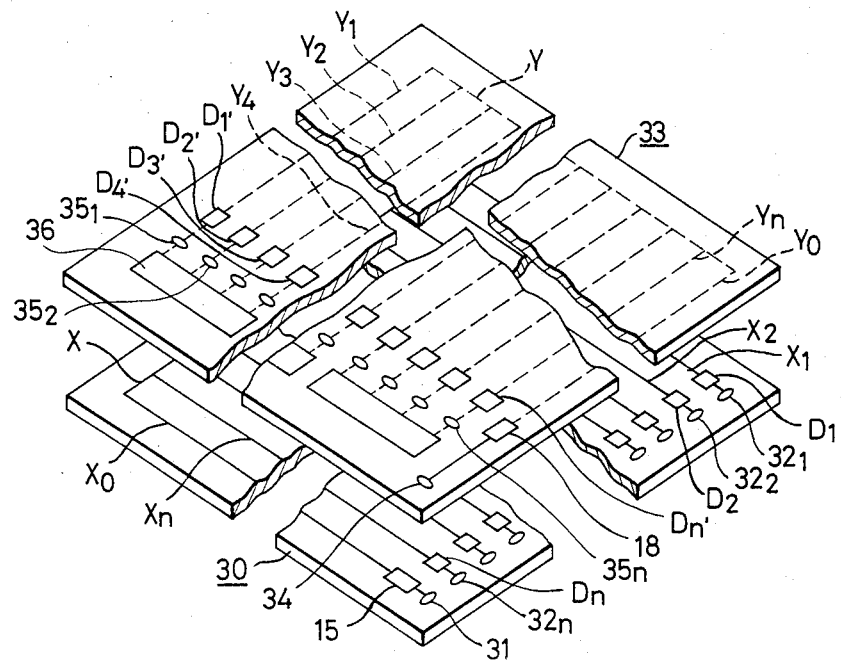
FIG. 7 is an exposed perspective view of an example embodying a position determining plate employed in the embodiment of FIG. 3.

One example of the concrete construction of the position determining plate $P_o$ employed in the embodiment described in connection with FIG. 3 will be explained with reference to FIG. 7. The plate $P_o$ has a first board 30 on which the common connecting line X, baseline $X_0$ and conductors $X_1$-$X_n$ are disposed. One end of the resistor 15 is connected to one end of the baseline $X_0$, while the other end of the resistor 15 is connected to a relay terminal 31 provided on the first boad 30. The anodes of the diodes $D_1$-$D_n$ which are also disposed on the first plate 30 are connected to the conductors $X_1-X_n$, respectively, and the cathodes of the diodes $D_1-D_n$ are connected to relay terminals $32_1-32_n$ provided on the first board 30, respectively.

The plate $P_o$ further includes a second board 33 on the underside of which the common connecting line Y, baseline $Y_0$ and conductors $Y_1-Y_n$ are disposed. One end of the resistor 18 is connected to one end of the baseline $Y_0$ and the other end of the resistor 18 is connected to a relay terminal 34 provided on the second board 33. The diodes $D_1'-D_n'$ are disposed on the second board 33 and have their anodes connected to the conductors $Y_1-Y_n$, respectively, and their cathodes connected to relay terminals $35_1-35_n$ provided on the second board 33, respectively. The terminals $35_1-35_n$ are also connected to a switch circuit block 36 which is fabricated by combining the switch driver 21 with the switch circuit S shown in FIG. 3 and provided on the second board 33.

The relay terminals $32_1-32_n$ on the first board 30 constructed as described above are respectively connected to the corresponding ones of the relay terminals $35_1-35_n$ on the second board 33 through lead wires. The direction in which the baseline $X_0$ and the conductors $X_1-X_n$ extend on the upper surface of the first board 30 is made perpendicular to the direction in which the baseline $Y_0$ and the conductors $Y_1-Y_n$ extend on the underside of the second board 33. Then, the first and second board 30 and 33 are disposed in such a manner that the upper surface of the first board 30 is close to the underside of the second board 33, so that the plate $P_o$ is formed.

Next, one example of the concrete construction of the position determining plate $P_o$ employed in the embodiment shown in FIG. 6 will be explained with reference to FIG. 8. This plate $P_o$ has a board 37, on the upper surface of which the common connecting line Y, baseline $Y_0$ and conductors $Y_1-Y_n$ are disposed. One end of the resistor 18 is connected to the baseline $Y_0$, while the other end of the resistor 18 is connected to a through hole type relay terminal 34 formed on the board 37. The conductors $Y_1-Y_n$ are connected to the switch circuit $S_Y$ provided in the form of plural integrated circuits on the board 37. The control terminals of the switch circuit $S_Y$ are respectively connected to the corresponding output ends of the switch driver 21 provided also in the form of plural integrated circuits on the board 37 through terminals $38_1-38_n$ of the through hole type formed on the board 37.

On the underside of the board 37, the common connecting line baseline $X_0$ and conductors $X_1-X_n$ are disposed. A through hole type relay terminal 31 formed on the board 37 is connected to the baseline $X_0$ through the resistor 15. The switch circuit $S_X$ provided in the form of plural integrated circuits on the board 37 is connected to the conductors $X_1-X_n$. The control terminals of the switch circuit $S_X$ are connected to the through hole type terminals $38_1-38_n$, respectively, through conductive paths formed on the underside of the board 37.

Figure 8:
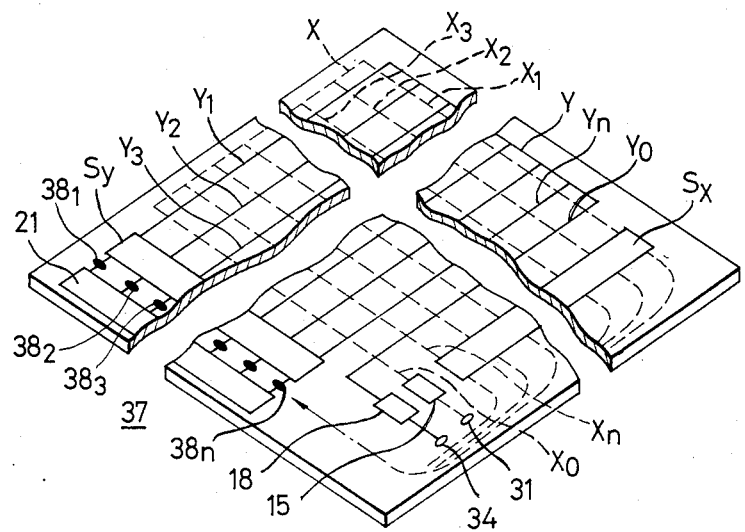
FIGS. 8, 9 and 10 are exposed and partial perspective views of examples embodying a position determining plate employed in the embodiment of FIG. 6.
Figure 9:
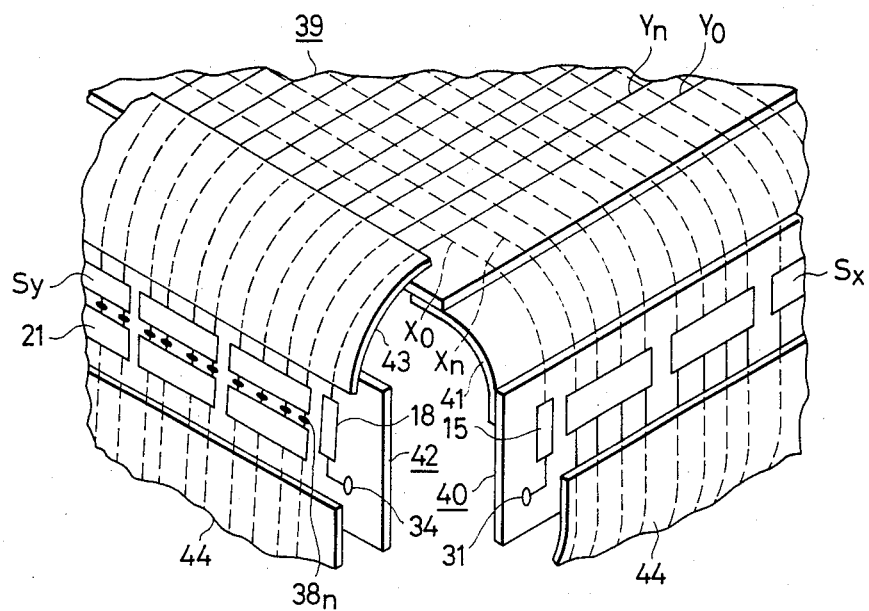

Referring to FIG. 9, there is shown another example of the concrete construction of the position determining plate $P_o$ employed in the embodiment of FIG. 6, which has three boards jointly corresponding to the board 37 of FIG. 8. In more detail, there is provided a first board 39, on the upper surface of which the common connecting line Y (not shown), baseline $Y_0$ and conductors $Y_1-Y_n$ are disposed. The common connecting line X (not shown), baseline $X_0$ and conductors $X_1-X_n$ are disposed on the underside of the first board 39. A second board 40 has the switch circuit $S_X$ provided in the form of plural integrated circuits, resistor 15 and a relay terminal 31 thereon. The baseline $X_0$ and the conductors $X_1-X_n$ on the first board 39 are connected to the register 15 and the switch circuit $S_X$, respectively, through connecting paths formed on a flexible board 41. A third board 42 has the switch circuit $S_Y$ provided in the form of plural integrated circuits, switch driver 21 provided also in the form of plural integrated circuits, resistor 18 and relay terminal 34 thereon. The baseline $Y_0$ and the conductors $Y_1-Y_n$ on the first board 39 are connected to the register 18 and the switch circuit $S_Y$, respectively, through connecting paths formed on a flexible board 43. Another flexible board 44 has connecting paths formed thereon to connect the terminals $38_1-38_n$ formed at the junction points between the control terminals of the switch circuit $S_Y$ and the output ends of the switch driver 21 on the third board 42 with the control terminals of the switch circuit $S_X$ on the second board 40, respectively.

Figure 10:
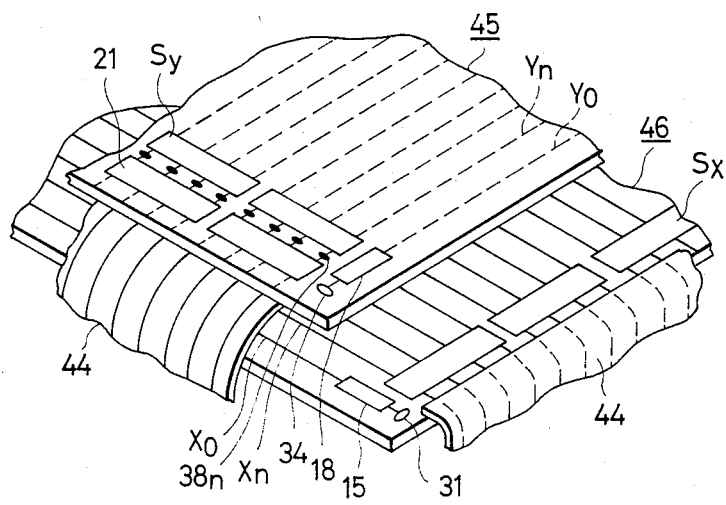

Referring to FIG. 10, there is shown a still further example of the concrete construction of the position determining plate $P_o$ employed in the embodiment of FIG. 6, in which a first board 45 and a second board 46 are used without use of the flexible boards 41 and 43 shown in FIG. 9. In this example, the common connecting line Y (not shown), baseline $Y_0$, conductors $Y_1-Y_n$, resistor 18, switch circuits $S_Y$, switch driver 21 and relay terminal 34 are disposed on the first board 45, and the common connecting line X (not shown), baseline $X_0$, conductors $X_1-X_n$, register 15, switch circuit $S_X$ and relay terminal 31 are disposed on the second terminal 46.

As is apparent from the above description, the coordinate position digitizing system according to the present invention is capable of determining any position on the position determining plate with quite a high resolution and therefore providing highly accurate positional data. Further, owing to the high resolution in determining a position, the space between the conductors neighboring each other on the position determining plate can be made relatively large, and this facilitates fabrication of the position determining plate and reduces the cost to manufacture the system.

Another distinctive feature of the system according to the present invention is that only one switch driving and controlling arrangement is required to selectively supply a direct current to two sets of conductors for determining a position on the position determining plate in two different directions, for example, the horizontal and vertical detections, and consequently the circuit configuration can be made quite simple.

Furthermore, in the system according to the present invention, only one information producing circuit arrangement is provided to produce positional data from the signal derived from the magnetic detecting means such as the pick-up coil section, and vertical positional data and horizontal positional data are alternately obtained by such an information producing circuit arrangement. This further facilitates simplification of the configuration of the system.

In the embodiments described above, only one of the conductors $X_1-X_n$ and $Y_1-Y_n$ is supplied with the DC voltage from the power supply at a time, and a reactive electromotive force arises when the supply of the DC voltage to the conductor is terminated. It is possible to reduce such reactive electromotive force by supplying the DC voltage to several of the conductors $X_1$-$X_n$ and $Y_1$-$Y_n$ at a time and then shifting the energized conductors in turn and so forth. According to such measures, there is no period in which the DC voltage is not supplied to any of the conductors $X_1$-$X_n$ and $Y_1$-$Y_n$, and consequently the reactive electromotive force can be reduced to such a level that no practical problem is caused thereby.

Although, in the embodiments described above, a plurality of switches $S_1$-$S_n$ or switches $S_{X1}$-$S_{Xn}$ and $S_{Y1}$-$S_{Yn}$ are installed to correspond to a plurality of conductors $X_1$-$X_n$ and $Y_1$-$Y_n$, and the switches $S_1$-$S_n$, $S_{X1}$-$S_{Xn}$ and $S_{Y1}$-$S_{Yn}$ forming the switch circuits S, $S_X$ and $S_Y$, respectively, are operated successively by the switch driver 21, a shift register having high output impedance may be used in place of the combination of the switch circuit S or the switch circuits $S_X$ and $S_Y$ and the switch driver 21. More specifically, the output terminals of the shift register are connected to the conductors $X_1$-$X_n$ and $Y_1$-$Y_n$, respectively, and the output end of the frequency divider 20 is connected to the input terminal of the shift register. In such a case, the shift register combines the function of the switch circuits for successively supplying a direct current to the conductors $X_1$-$X_n$ and $Y_1$-$Y_n$ with the function of the switch driver for driving the switch circuits, thus contributing to a simplification of the configuration of the system.

In addition, although the counting operation of the counter 25 is stopped by the output signal from the zero-crossover detector 24 in the aforementioned embodiments, the zero-crossover detector 24 may be replaced by a level discriminator so that the aforementioned counting operation of the counter 25 is stopped when the output signal of the low-pass filter 23 reaches a predetermined level. Further, the magnetic flux detecting means may be formed by a Hall device or the like in place of the pick-up coil secton 22.

Although various minor changes and modifications might be proposed by those skilled in the art, it will be understood that we wish to include within the claims in the patent warranted hereon all such changes and modifications as reasonably come within our contribution to the art.

What is claimed is:

1. A coordinate position digitizing system comprising:
    a position determining plate having a first connecting line along a first direction on the plate and a second connecting line along a second direction on the plate, a plurality of first conductors extending in parallel with one another at intervals of a regular space, each of said first conductors having one end connected to said first connecting line as a common line, a plurality of second conductors extending in parallel with one another at intervals of a regular space and across said first conductors, each of said conductors having one end connected to said second connecting line as a common line,
    first and second control switch means, the first control switch means selectively connecting the first connecting line to one pole of a power supply when the second control switch means is open and the second control switch means selectively connecting the second connecting line to said one pole of the power supply, so that the first and second switch means alternately connect the first and second lines to said one pole,
    driving and controlling means provided in common to said first conductors and said second conductors for sequentially connecting the other ends of said first conductors to another pole of the power supply during a first sequence when said first control switch means is closed and for sequentially connecting the other ends of said second conductors to said another pole of the power supply during a second sequence when said second control switch means is closed,
    pick-up means movably positioned with respect to the position determining plate and responsive to field variations caused by the operation of the driving and controlling means to produce a signal representative of the position of the pick-up means with respect to the first and second directions of the position determining plate, and
    information producing means connected to the pick-up means for producing a smoothly varying signal from a signal output by the pick-up means, and for determining a cross-over of the smoothened signal over a predetermined potential, the information producing means including timing means for receiving a first time signal for each entire first and second sequence when one of the first or second position switches is closed and for receiving a second time signal corresponding to said cross-over of said predetermined potential, and utilizing said first and second time signals to determine a horizontal or vertical position of the pick-up means depending upon whether the second or first position switch is closed.

2. A coordinate position digitizing system according to claim 1, wherein said driving and controlling means comprises a plurality of switch means connected between the other ends of said first and second conductors and the other pole of the power supply, respectively, and switch driving means for actuating said switch means individually in turn.

3. A coordinate position digitizing system according to claim 2, wherein each of said switch means is provided in common to the corresponding one of said first conductors and the corresponding one of said second conductors.

4. A coordinate position digitizing system according to claim 2, wherein said switch means are divided into a first group connected to said first conductors and a second group connected to said second conductors, which are actuated in common by said switch driving means.

5. A coordinate position digitizing system according to claim 1, wherein said driving and controlling means comprises a shift register having a plurality of output terminals connected respectively to the other ends of said first and second conductors.

6. A coordinate position digitizing system according to claim 1, wherein said pick-up means comprises magnetic flux detecting means operative to produce an output signal in response to variations in the magnetic field on said position determining plate.

7. A coordinate position digitizing system according to claim 6, wherein said magnetic flux detecting means comprising a pick-up coil and an amplifier circuit for amplifying the output of said pick-up coil.

8. A coordinate position digitizing system according to claim 1, wherein said positional information producing means comprises a low-pass filter means for producing said low frequency signal based on the signal generated by said pick-up means, a zero-crossover detector means for detecting a zero-crossover point of said low frequency signal from said low-pass filter means and a counter means starting its counting operation at said predetermined reference time point and stopping its counting operation at said measured time point when the zero-crossover point of said low frequency signal is detected by said zero-crossover detector means.

9. A coordinate position digitizing system, comprising:
   a position determining plate having a plurality of vertical conductors and a plurality of horizontal conductors each connecting at one end to a respective first or second common line;
   a first power supply terminal having vertical position and horizontal position switches connected thereto, the vertical position switch connecting to the first common line and the horizontal position switch connecting to the second common line;
   a switch means having a plurality of switch sections;
   diode coupling means for connecting one respective horizontal and one respective vertical conductor to one respective switch section of said switch means such that each switch section is common to the one respective vertical conductor and the one respective horizontal conductor;
   switch driving means for sequentially closing the switch sections so as to connect the respective horizontal conductors to a second power supply terminal when the horizontal position switch is closed and the vertical position switch is opened and for sequentially closing the switch sections so as to connect the respective vertical conductors to the second power supply terminal when the vertical position switch is closed and the horizontal position switch is opened;
   pick-up detector means movably positionable on the determining plate and responsive to field variations caused by currents flowing through various vertical and horizontal conductors and producing corresponding output signals; and
   information producing means connected to the pick-up means for producing a smoothly varying signal from a signal output by the pick-up means, and for determining a cross-over of the smoothened signal over a predetermined potential, the information producing means including timing means for receiving a first time signal for each entire sequence of all switch sections when one of the vertical or horizontal position switches is closed and for receiving a second time signal corresponding to said cross-over of said predetermined potential, and utilizing said first and second time signals to determine a horizontal or vertical position of the pick-up means depending upon whether the horizontal or vertical position switch is closed.

10. A coordinate position digitizing system, comprising:
    a position determining plate having a plurality of vertical conductors and a plurality of horizontal conductors each connecting at one end to a respective first or second common line;
    a first power supply terminal having vertical position and horizontal position switches connected thereto, the vertical position swtich connecting to the first common line and the horizontal position switch connecting to the second common line;
    a horizontal switch means and a vertical switch means each of which has a plurality of switch sections;
    each of the vertical conductors connecting to a respective switch section of the vertical switch means;
    each of the horizontal conductors connecting to a respective switch section of the horizontal switch means;
    switch driving means for sequentially closing the switch sections of the horizontal switch means so as to connect each of the respective horizontal conductors to a second power supply terminal when the horizontal position switch is closed and the vertical position switch is opened, and for sequentially closing the switch sections of the vertical switch means so as to connect each of the respective vertical conductors to the second power supply terminal when the vertical position switch is closed and the horizontal position switch is opened;
    pick-up detector means movably positionable on the determining plate and responsive to field variations caused by currents flowing through the various vertical and horizontal conductors and producing corresponding output signals;
    information producing means connected to the pick-up means for producing a smoothly varying signal from a signal output by the pick-up means, and for determining a cross-over of the smoothened signal over a predetermined potential, the information producing means including timing means for receiving a first time signal for each entire sequence of all switch sections when one of the vertical or horizontal position switches is closed and for receiving a second time signal corresponding to said cross-over of said predetermined potential, and utilizing said first and second time signals to determine a horizontal or vertical position of the pick-up means depending upon whether the horizontal or vertical position switch is closed.

* * * * *